(12) United States Patent
Wang et al.

(10) Patent No.: US 9,731,605 B2
(45) Date of Patent: Aug. 15, 2017

(54) METHOD AND APPARATUS FOR CONTROLLING AN ELECTRIFIED POWERTRAIN SYSTEM OF A VEHICLE

(71) Applicant: GM GLOBAL TECHNOLOGY OPERATIONS LLC, Detroit, MI (US)

(72) Inventors: Konking (Michael) Wang, Canton, MI (US); Aniket Kothari, Southfield, MI (US); William T. Ivan, Shelby Township, MI (US); Steven V. Wybo, Grosse Pointe Park, MI (US); Ying Tan, Plymouth, MI (US); Michael M. Gandham, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 14/633,538

(22) Filed: Feb. 27, 2015

(65) Prior Publication Data
US 2016/0250927 A1 Sep. 1, 2016

(51) Int. Cl.
*B60L 1/00* (2006.01)
*B60L 11/18* (2006.01)

(52) U.S. Cl.
CPC .......... *B60L 1/003* (2013.01); *B60L 11/1805* (2013.01); *Y02T 10/7005* (2013.01); *Y02T 10/7216* (2013.01); *Y02T 10/7241* (2013.01); *Y02T 10/7275* (2013.01); *Y02T 90/16* (2013.01)

(58) Field of Classification Search
CPC .............................. B60L 11/1805; B60L 1/003

USPC ........................................................ 307/10.1
See application file for complete search history.

(56) References Cited

U.S. PATENT DOCUMENTS

| | | | | |
|---|---|---|---|---|
| 8,502,410 B2* | 8/2013 | Heller | ........................ | B60L 1/00 180/65.1 |
| 8,606,447 B2* | 12/2013 | Namuduri | ............. | B60W 20/00 701/22 |
| 9,438,144 B2* | 9/2016 | Xu | ............................ | H02P 6/12 |
| 2010/0225258 A1* | 9/2010 | Namuduri | ............. | B60K 6/485 318/400.3 |
| 2014/0265979 A1* | 9/2014 | Xu | ............................ | H02P 6/12 318/478 |
| 2016/0344329 A1* | 11/2016 | Xu | ............................ | H02P 6/12 |

\* cited by examiner

*Primary Examiner* — Jared Fureman
*Assistant Examiner* — Duc M Pham
(74) *Attorney, Agent, or Firm* — Quinn IP Law

(57) ABSTRACT

An electrified powertrain system for a vehicle includes an electric machine coupled to a driveline. An inverter controller communicates directly with an auxiliary power module. An ignition module indicates either a key-on state or a key-off state. When the ignition module is in a key-off state, a low-power DC/DC converter generates an output voltage originating on the high-voltage DC bus having a magnitude sufficient to activate the inverter controller. The inverter controller detects a key-off uncontrolled generator (UCG) mode. The inverter controller directly communicates detection of the key-off UCG mode to the auxiliary power module. The inverter controller controls the inverter. The auxiliary power module supplies electric power to operate low-voltage electrically-powered powertrain actuators.

17 Claims, 3 Drawing Sheets

US 9,731,605 B2

METHOD AND APPARATUS FOR CONTROLLING AN ELECTRIFIED POWERTRAIN SYSTEM OF A VEHICLE

TECHNICAL FIELD

This disclosure relates to electrified powertrain systems, and control associated therewith.

BACKGROUND

Electric machines, e.g., multi-phase electric motor/generators, have stator windings that are energized by alternating current from inverter modules that electrically connect to high-voltage DC electrical power buses. During specific operating conditions, including high-speed, low or no load conditions, an electric machine, e.g., a permanent magnet (PM) motor may operate in an uncontrolled generator (UCG) mode, wherein motor back-emf increases, resulting in a motor output voltage that is greater than voltage on the high-voltage bus. Back-emf (electromotive force) refers to voltage generated in an electric motor caused by motion of an armature in relation to magnetic fields from field magnets or windings, with such voltage being related to motor speed and other factors. Back-emf is a separate effect from motor inductance. This excess output voltage may result in a charging current flow through one or more of the diodes arranged in parallel to the switches of the inverter to the high-voltage battery. The charging current flow occurring in the UCG mode may result in excess current through components of the inverter or overcharging of the high-voltage battery that can negatively affect service life of the inverter or the high-voltage battery. Designers may select electrical component design factors and derating schemes that comprehend occurrence of excess charging in the UCG mode.

SUMMARY

An electrified powertrain system for a vehicle is described, and includes an electric machine that mechanically rotatably couples to a driveline, an inverter module including an inverter electrically connecting a high-voltage DC power bus to the electric machine, an inverter controller and a low-power DC/DC converter. The low-power DC/DC converter electrically connects between the high-voltage DC power bus and the inverter controller. An auxiliary power module electrically connects between the high-voltage DC power bus and a low-voltage DC power bus. The inverter controller communicates directly with the auxiliary power module. The auxiliary power module supplies electric power to a plurality of low-voltage electrically-powered powertrain actuators, and an ignition module indicates either a key-on state or a key-off state. When the ignition module is in a key-off state, the low-power DC/DC converter generates an output voltage having a magnitude sufficient to activate the inverter controller. The inverter controller detects a key-off uncontrolled generator (UCG) mode. The inverter controller directly communicates detection of the key-off UCG mode to the auxiliary power module. The inverter controller controls the inverter. The auxiliary power module supplies electric power to operate the low-voltage electrically-powered powertrain actuators.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
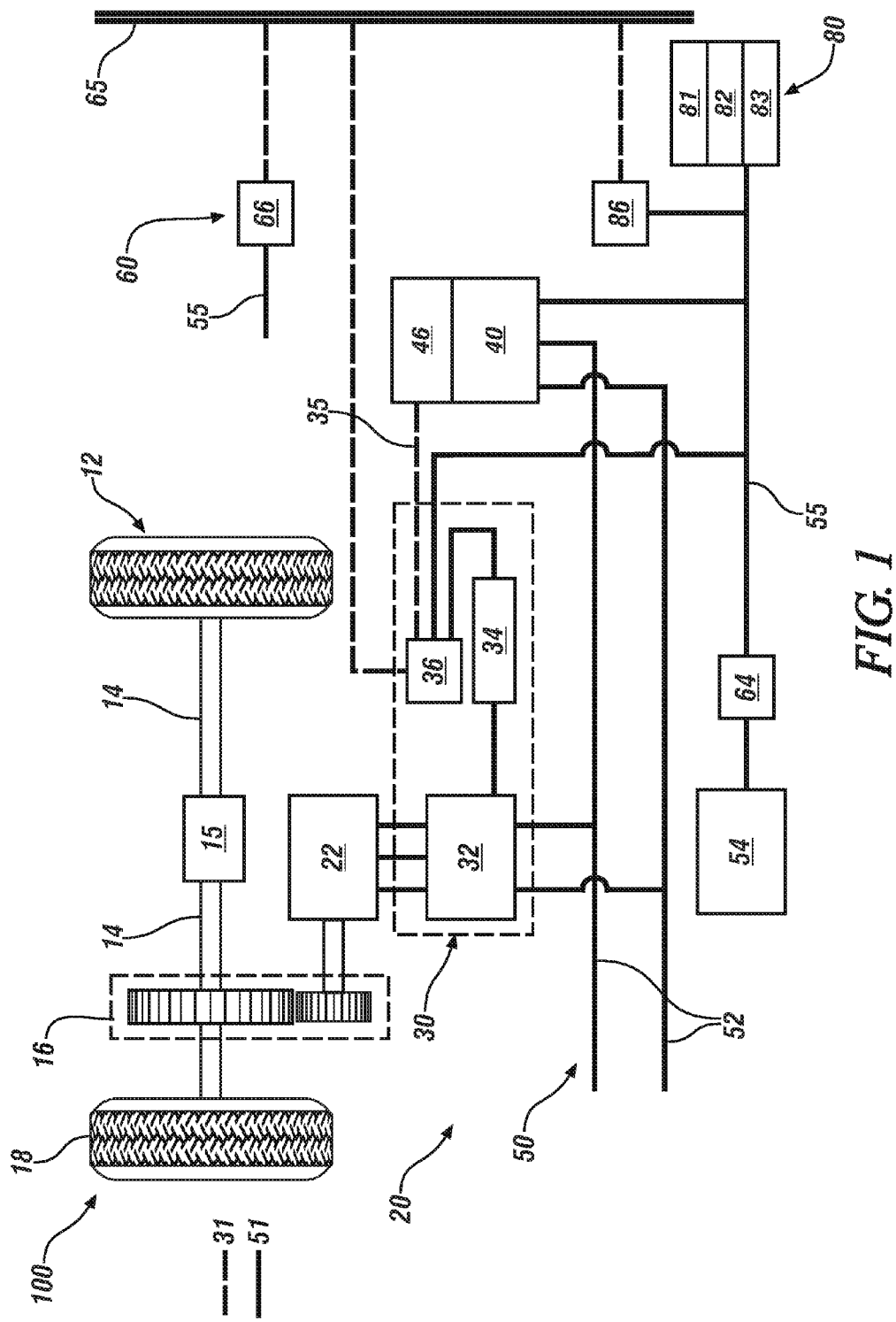
FIG. 1 schematically illustrates a first embodiment of a vehicle including an electrified powertrain system, an electric power distribution system and a first controller architecture, in accordance with the disclosure.

Referring now to the drawings, wherein the depictions are for the purpose of illustrating certain embodiments only and not for the purpose of limiting the same, FIG. 1 schematically illustrates a first embodiment of a vehicle 100 including an electrified powertrain system 20, an electric power distribution system 50 and a first controller architecture 60. Like numerals refer to like elements in the various figures. Various signal communication lines are indicated by dashed lines 31 and various electric power lines are indicated by solid lines 51. The vehicle 100 includes an ignition module 64, which can be any device through which a vehicle operator gains access to and commands and controls initial operation of the vehicle 100. This includes controlling, i.e., activating or deactivating various vehicle systems including those related to powertrain systems and accessories. The ignition module 64 may be controlled by the vehicle operator by a key, a key-fob, or another suitable mechanism.

The electrified powertrain system 20 includes an electric machine 22 that mechanically rotatably couples to a gear train 16 that mechanically rotatably couples to a driveline 12 and provides propulsion torque thereto. The driveline 12 includes either a single one or a pair (as shown) of drive wheels 18 that mechanically couple via axles 14 and a differential 15 to a first member of the gear train 16. The electric machine 22 mechanically couples to a second member of the gear train 16. The gear train 16 is preferably arranged as a direct-drive fixed-gear configuration with rotational speeds based upon a gear ratio of the gear train 16. As such, torque generated by the electric machine 22 drives rotation of the drive wheels 18 of the driveline 12 when operating the electrified powertrain system 20 in a propulsion state and torque generated by the rotation of the drive wheels 18 of the driveline 12 due to vehicle momentum drives rotation of the electric machine 22 under specific operating conditions, including when operating the electrified powertrain system 20 in a regenerative braking state.

The electric machine 22 may be a multi-phase permanent magnet electric motor/generator in one embodiment.

A power inverter module 30 controls electric power flow to the electric machine 22. The power inverter module 30 in this embodiment includes a multi-phase inverter circuit (inverter) 32, an inverter controller 36 and a low-power DC/DC converter 34. The inverter 32 electrically connects to a high-voltage DC power source via a high-voltage DC power bus 52 that includes a positive bus element and a negative bus element. In one embodiment, the high-voltage DC power source supplies DC that is near 300V. The high-voltage DC power source can include a high-voltage electrical energy storage device, e.g., a high-voltage battery or a capacitor, a high-voltage electric power generator or another related device or system. The inverter 32 includes a plurality of switch pairs that electrically connect in series across the high-voltage DC power bus 52. Each switch of the switch pairs may be a power transistor, e.g., an Insulated Gate Bipolar Transistor (IGBT), or another suitable power transistor. Each of the switch pairs corresponds to a phase of the electric machine 22. The inverter 32 preferably includes other electrical components including capacitors, resistors and other electrical circuit components to accomplish functions related to electrical noise suppression, load balancing and the like.

High-voltage as used herein is understood to mean nominal voltage levels used primarily in propulsion applications for the vehicle (e.g., for high-voltage electric machines). Low-voltage as used herein is understood to mean nominal voltage levels used primarily in low voltage accessory loads for the vehicle (e.g. for high-voltage electric machines). More generally, as used herein, high-voltage and low-voltage are understood to mean nominal voltage levels relative to each other.

The low-power DC/DC converter 34 electrically connects to the high-voltage DC power bus 52 through the power inverter module 30 and converts a portion of the high-voltage electric power to low-voltage electric power, wherein the low-voltage electric power is DC electric power that is near 12V. The low-power DC/DC converter 34 may be an electric switch-mode DC-to-DC converter, or another suitable device. The low-power DC/DC converter 34 electrically connects to a power supply of the inverter controller 36 to activate and wake-up the inverter controller 36 when the vehicle 100 is keyed off.

The inverter controller 36 communicates with each of the switches of the inverter 32 to control operation thereof, with control commands generated in response to commands from an electric powertrain controller (HCP) 66.

The electric power distribution system 50 includes the high-voltage DC power bus 52 and a low-voltage system. The low-voltage system includes a low-voltage battery 54 and a low-voltage DC power bus 55 that electrically connects to the inverter controller 36 and an auxiliary power module (APM) 40, which supplies low-voltage electric power to low-voltage systems on the vehicle including one or a plurality of low-voltage electrically-powered actuators 80. In one embodiment, the electrically-powered actuators 80 may include an electric machine cooling pump 81, an oil pump 82 and an APM cooling pump 83. Electric power between the low-voltage battery 54 and the low-voltage DC power bus 55 is controlled by the ignition module 64, which is preferably activatable by the operator. The ignition module 64 may be in a key-on state that is associated with vehicle operation, a key-accessory state or a key-off state that is associated with vehicle shut-off.

The AVM 40 electrically connects to the high-voltage DC power bus 52 and electrically connects to the tow-voltage DC power bus 55. The APM 40 preferably includes a DC-DC power converter that converts DC electric power from a high-voltage level to a tow-voltage level, and vice versa, the operation of which is controlled by an APM controller 46. In one embodiment, the APM 40 is configured as a DC-DC power converter that only converts DC electric power from a high-voltage level to a low-voltage level, in order to minimize component cost. That is, the APM 40 converts power at high voltage supplied through the high-voltage DC power bus 52 to low voltage power suitable for charging the low-voltage battery 54 and/or directly powering one or more of the low-voltage electrically-powered actuators 80 as needed. The HCP 66 includes algorithms and control logic to control electric power flow between the high-voltage DC power bus 52 and the low-voltage battery 54 to provide the required electrical functionality.

The first controller architecture 60 includes the inverter controller 36, the APM controller 46, the HCP 66 and a body controller (BCM) 86, all of which communicate directly and/or via a communications bus 65, which is a controller area network (CAN) bus in one embodiment. Furthermore, the inverter controller 36 directly communicates with the APM controller 46 via a signal line 35. The inverter controller 36 may also communicate with the APM controller 46 via the communications bus 65.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during ongoing operation. Communications between controllers and between controllers, actuators and/or sensors may be accomplished using a direct wired link, a networked communications bus link, a wireless link or any another suitable communications link.

The vehicle 100 may be subjected to operating conditions that may result in operating the electric machine 22 in an uncontrolled generator (UCG) mode, wherein motor back-emf increases, resulting in an output voltage from the electric machine 22 that may be greater than voltage on the high-voltage DC power bus 52. Such operating conditions may include high-speed operation under low-load or no-load conditions. One specific UCG mode of operation includes operating conditions that may occur when the vehicle 100 is being towed with the drive wheels 18 rotating, referred to herein as a key-off UCG mode. The key-off UCG mode includes both the key-off state and the key-accessory state. When subject to towing, the vehicle 100 may be in the key-off state or the key-accessory state, wherein the ignition module 64 is not activated, thus electrically decoupling the low-voltage battery 54 from the low-voltage DC power bus 55. Furthermore, the vehicle controllers, including the inverter controller 36, APM controller 46, HCP 66 and BCM 86 are unpowered and thus non-operational.

When subjected to towing, the back-emf through the electric machine 22 may increase due to rotation of the vehicle wheels 18 on a ground surface that rotate a rotor of the electric machine 22, with such rotation generating electric power that flows from the electric machine 22 and may be transferred through the inverter 32 to the high-voltage DC power bus 52. The low-power DC/DC converter 34 converts a portion of the electric power flow associated with back-emf to a voltage level suitable for powering the inverter controller 36 and other elements, thus activating or 'waking' the inverter controller 36. Upon being awakened in this manner, the inverter controller 36 executes monitoring routines to detect and verify occurrence of the key-off UCG mode. Such monitoring routines include verifying that the ignition module 64 is not activated, and monitoring rotational speed of the vehicle wheels 18 to determine that the vehicle wheels 18 are or have been rotating with the ignition switch deactivated.

Figures 2, 4:
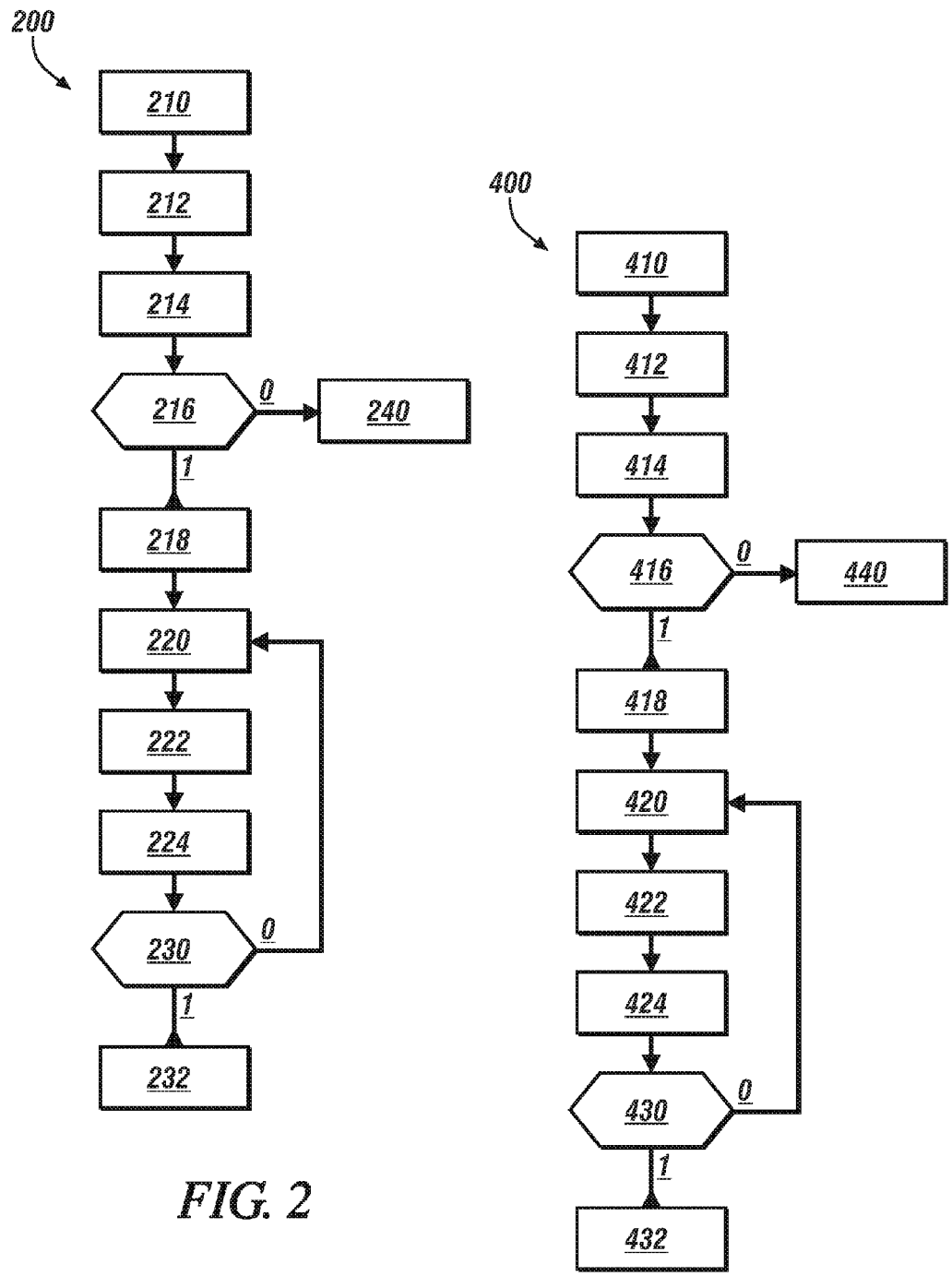
FIG. 2 schematically shows a first uncontrolled generation (UCG) detection and mitigation process for operating the first embodiment of the vehicle described with reference to FIG. 1 that includes detecting and mitigating vehicle operation in a key-off UCG mode, in accordance with the disclosure.
FIG. 4 schematically shows a first uncontrolled generation (UCG) detection and mitigation process for operating the first embodiment of the vehicle described with reference to FIG. 1 that includes detecting and mitigating vehicle operation in a key-off UCG mode, in accordance with the disclosure.

FIG. 2 schematically shows a first UCG detection and mitigation process 200 for operating an embodiment of the vehicle 100 described with reference to FIG. 1 that includes detecting and mitigating vehicle operation in the key-off UCG mode. The first UCG detection and mitigation process 200 preferably initiates by a process of waking up and activating one of the vehicle controllers, e.g., the inverter controller 36, and executes as one or a plurality of control routines executed in various ones of the vehicle controllers, including the inverter controller 36, APM controller 46, HCP 66 and BCM 86. Table 1 is provided as a key wherein the numerically labeled blocks and the corresponding functions are set forth as follows, corresponding to the UCG detection and mitigation process 200.

TABLE 1

| BLOCK | BLOCK CONTENTS |
|---|---|
| 210 | Detect presence of high voltage on the HV bus during vehicle key-off |
| 212 | DC/DC converter in inverter module generates voltage to activate inverter controller |
| 214 | Inverter controller wakes up and executes UCG detection |
| 216 | Is UCG detected? |
| 218 | Inverter controller generates and communicates wake-up command to APM |
| 220 | APM generates 12 V output for LV bus 55 |
| 222 | Inverter controller controls inverter |
| 224 | APM supplies power to operate cooling systems for power electronics and electric machine |
| 230 | Is voltage on HV bus greater than threshold? |
| 232 | Shutdown inverter controller, APM |
| 240 | End |

When subject towing, the vehicle 100 may be in a key-off state, wherein the ignition module 64 is not activated, thus electrically decoupling the low-voltage battery 54 from the low-voltage DC power bus 55. Furthermore, the vehicle controllers, including the inverter controller 36, APM controller 46, HCP 66 and BCM 86 are unpowered and thus non-operational. Thus, no electric power is supplied from the APM 40 to operate the cooling systems including, e.g., the electric machine cooling pump 81, the oil pump 82 and the APM cooling pump 83.

The UCG detection and mitigation process 200 initiates when presence of voltage on the high-voltage DC power bus 52 that is greater than a minimum threshold value is detected during vehicle key-off, with such detection (210). The magnitude of voltage on the high-voltage DC power bus 52 is at or near zero under such conditions, and the minimum threshold value may be on the order of magnitude of 300 volts in order to pass through the low-power DC/DC converter 34 and generate sufficient voltage to wake-up and activate the inverter controller 36. When the minimum threshold value is achieved, the inverter controller 36 wakes up and activates (212) including executing a key-off UCG mode detection routine. The key-off UCG mode detection routine preferably includes monitoring speed of the vehicle 100 at the driveline 12 or the electric machine 22, voltage on the high-voltage DC power bus 52 and the ignition module 64 (214). When the speed of the vehicle 100 at the driveline 12 or the electric machine 22 is greater than a threshold, e.g., 5 mph, the voltage on the high-voltage DC power bus 52 is greater than a threshold and the ignition module 64 is in the key-off state (216)(1), operation in the key-off UCG mode is verified and mitigation strategies are enacted (Steps 218, et. seq.). Otherwise (216)(0), execution of the UCG detection and mitigation process 200 ends (240).

UCG mitigation, including a key-off UCG mitigation includes as follows. The inverter controller 36 generates and directly communicates an activation or wake-up command to the APM controller 46 via the signal line 35 (218). The APM 46 generates low-voltage electrical power that is supplied to the low-voltage DC power bus 55 to operate the cooling systems for power electronics and electric machine operation, e.g., the low-voltage electrically-powered actuators 80 including the electric machine cooling pump 81, the oil pump 82 and the APM cooling pump 83 (220, 224). The inverter controller 36 controls activation and deactivation of the switches of the inverter 32 (222). This preferably includes operating in a back-emf mode or voltage-regulation mode or zero-torque control mode wherein the electric machine 22 is closed-loop controlled on the high-voltage DC power bus 52 with voltage controlled within an APM operating voltage range. The inverter 32 is controlled in the back-emf mode by commanding 3-phase short operation with short periods of 3-phase operation periodically to keep the voltage on the high-voltage DC power bus 52 within an allowable voltage range. The inverter 32 is controlled in the voltage-regulation mode by commanding the IGBT switching to actively rectify the DC bus voltage to a desirable voltage level. When the HV battery is connected to the DC bus, zero-torque command can be utilized to mitigate the high back-emf voltage by injecting a field weakening current.

This operation continues so long as the voltage on the high-voltage DC power bus 52 remains greater than a minimum threshold voltage (230)(0). When the voltage on the high-voltage DC power bus 52 falls below the threshold (230)(1), which may occur when the vehicle is no longer being towed above a certain speed (e.g. 20 mph), the controller arranges for an orderly shutdown of the vehicle controllers, including the inverter controller 36, APM controller 46, HCP 66 and BCM 86.

Figure 3:
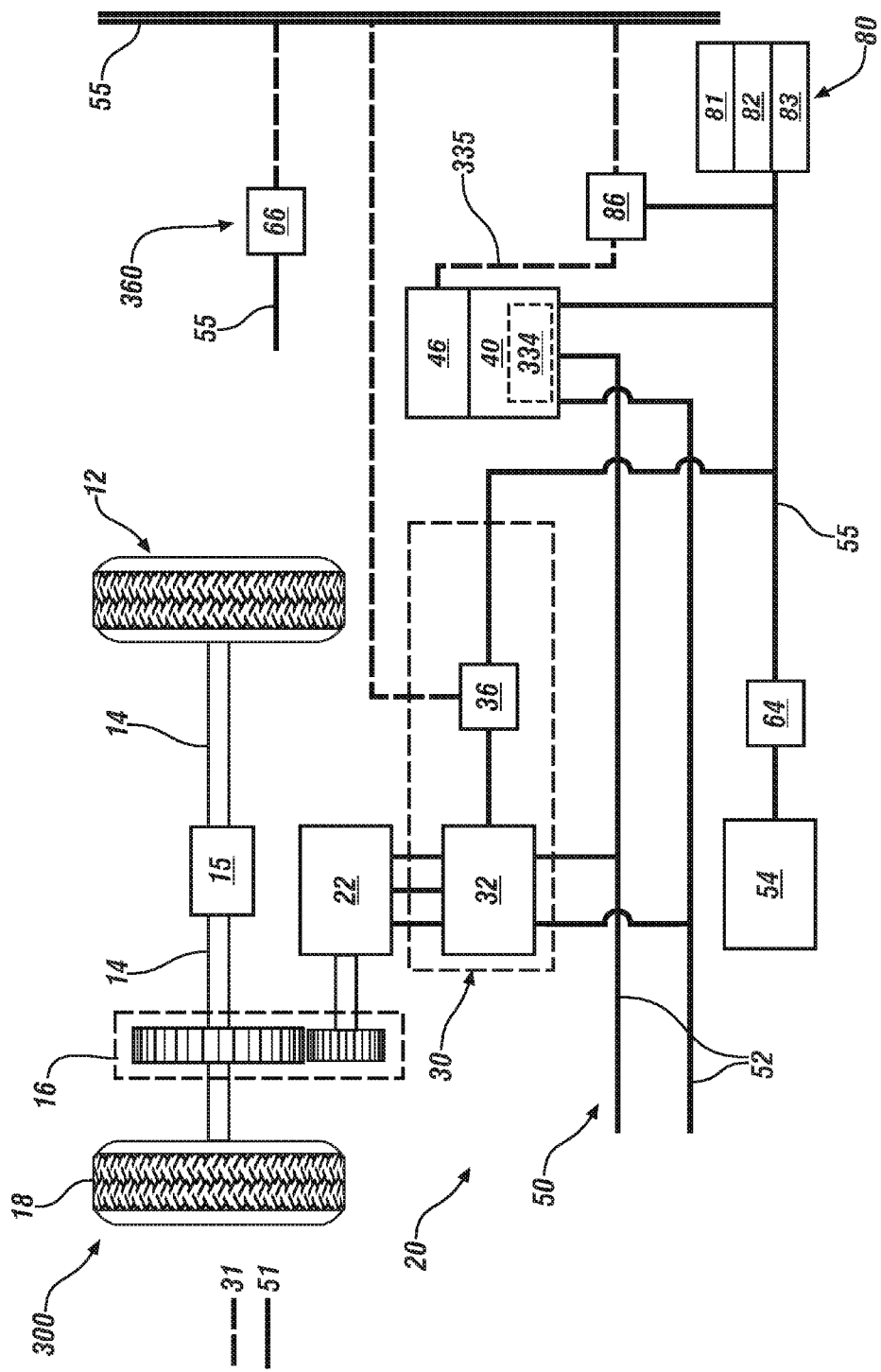
FIG. 3 schematically illustrates a second embodiment of a vehicle including an electrified powertrain system, an electric power distribution system and a second controller architecture, in accordance with the disclosure.

FIG. 3 schematically illustrates a second embodiment of a vehicle 300 including an electrified powertrain system 20, an electric power distribution system 50 and a second controller architecture 360. Various signal communication lines are indicated by dashed lines 31 and various electric power lines are indicated by solid lines 51. The vehicle 300 includes an ignition module 64, which can be any device through which a vehicle operator gains access to and commands and controls initial operation of the vehicle 300. This includes controlling, i.e., activating or deactivating various vehicle systems including those related to powertrain systems and accessories. The ignition module 64 may be controlled by the vehicle operator by a key, a key-fob, or another suitable mechanism.

The electrified powertrain system 20 and the electric power distribution system 50 of FIG. 3 differs from those described with reference to FIG. 1 in that the low-power DC/DC converter 34 is omitted from the power inverter module 30, and an analogous low-power DC/DC converter 334 is incorporated into the APM 40. The low-power DC/DC converter 334 electrically connects to the high-voltage DC power bus 52 through power inverter module 30 and converts a portion of the high-voltage electric power to low-voltage electric power, wherein the low-voltage electric power is DC electric power that is near 12V. The low-power DC/DC converter 334 electrically connects to a power supply of the APM controller 46 to activate and wake-up the APM controller 46 when the vehicle 300 is keyed off.

The second controller architecture 360 includes the inverter controller 36, the APM controller 46, the HCP 66 and the BCM 86, all of which communicate directly and/or via a communications bus 65, which is a controller area network (CAN) bus in one embodiment. Furthermore, the APM controller 46 directly communicates with the BCM 86 via a signal line 335. The APM controller 46 may also communicate with the BCM controller 86 via the communications bus 65.

FIG. 4 schematically shows a second UCG detection and mitigation process 400 for operating an embodiment of the vehicle 300 described with reference to FIG. 3 that includes detecting and mitigating vehicle operation in the key-off UCG mode. The second UCG detection and mitigation process 400 preferably initiates by a process of waking up and activating one of the vehicle controllers, e.g., the APM controller 46, and executes as one or a plurality of control routines executed in various ones of the vehicle controllers, including the inverter controller 36, APM controller 46, HCP 66 and BCM 86. Table 1 is provided as a key wherein the numerically labeled blocks and the corresponding functions are set forth as follows, corresponding to the UCG detection and mitigation process 400.

TABLE 1

| BLOCK | BLOCK CONTENTS |
|---|---|
| 410 | Detect presence of high voltage on the HV bus during vehicle key-off |
| 412 | DC/DC converter in inverter module generates voltage to activate APM controller |
| 414 | APM controller wakes up and executes UCG detection |
| 416 | Is UCG detected? |
| 418 | APM controller generates and communicates wake-up command to BCM, inverter controller |
| 420 | APM generates 14 V output for LV bus 55 |
| 422 | Inverter controller controls inverter |
| 424 | APM supplies power to operate cooling systems for power electronics and electric machine |
| 430 | Is voltage on HV bus greater than threshold? |
| 432 | Shutdown inverter controller, APM, BCM |
| 440 | End |

When subject towing, the vehicle 300 may be in a key-off state, wherein the ignition module 64 is not activated, thus electrically decoupling the low-voltage battery 54 from the low-voltage DC power bus 55. Furthermore, the vehicle controllers, including the inverter controller 36, APM controller 46, HCP 66 and BCM 86 are unpowered and thus non-operational. Thus, no electric power is supplied from the APM 40 to operate the cooling systems including, e.g., the electric machine cooling pump 81, the oil pump 82 and the APM cooling pump 83.

The UCG detection and mitigation process 400 initiates when presence of voltage on the high-voltage DC power bus 52 that is greater than a minimum threshold value is detected during vehicle key-off (410). The magnitude of voltage on the high-voltage DC power bus 52 is at or near zero under such conditions, and the minimum threshold value may be on the order of magnitude of 300 volts in order to pass through the low-power DC/DC converter 34 and generate sufficient voltage to wake-up and activate the APM 46. When the minimum threshold value is achieved, the APM 46 activates (412) and executes a key-off UCG mode detection routine. The key-off UCG mode detection routine preferably includes monitoring speed of the vehicle 300 at the driveline 12 or the electric machine 22, voltage on the high-voltage DC power bus 52 and the ignition module 64 (414). When the speed of the vehicle 100 at the driveline 12 or the electric machine 22 is greater than a threshold, e.g., 45 mph, the voltage on the high-voltage DC power bus 52 is greater than a threshold, e.g., 300 volts, and the ignition module 64 is in the key-off state (416)(1), operation in the key-off UCG mode is verified and mitigation strategies are enacted (Steps 418, et. seq.). Otherwise (416)(0), execution of the UCG detection and mitigation process 400 ends (440).

UCG mitigation, including a key-off UCG mitigation is now described. The APM 40 generates and directly communicates an activation or wake-up command to the BCM 46 via the signal line 335 (418). The APM 46 generates low-voltage electrical power that is supplied to the low-voltage DC power bus 55 to operate cooling systems for power electronics and electric machine operation, e.g., the low-voltage electrically-powered actuators 80 including the electric machine cooling pump 81, the oil pump 82 and the APM cooling pump 83 (420, 424). The inverter controller 36 controls activation and deactivation of the switches of the inverter 32 (422). This preferably includes operating in a back-emf mode or voltage-regulation mode or zero-torque control mode wherein the electric machine 22 is closed-loop controlled on the high-voltage DC power bus 52 with voltage controlled within an APM operating voltage range. The inverter 32 is controlled in the back-emf mode by commanding 3-phase short operation with short periods of 3-phase operation periodically to keep the voltage on the high-voltage DC power bus 52 within an allowable voltage range. The inverter 32 is controlled in the voltage-regulation mode by commanding the IGBT switching to actively rectify the DC bus voltage to a desirable voltage level. When the HV battery is connected to the DC bus, zero-torque command can be utilized to mitigate the high back-emf voltage by injecting the field weakening current.

This operation continues so long as the voltage on the high-voltage DC power bus 52 remains greater than a minimum threshold voltage (430)(0). When the voltage on the high-voltage DC power bus 52 falls below the threshold (430)(1), which may occur when the vehicle is no longer being towed above a certain speed, e.g., 20 mph, the HCP 66 arranges for an orderly shutdown of the vehicle controllers, including the inverter controller 36, APM controller 46, HCP 66 and BCM 86.

The UCG detection and mitigation process described herein provides a cost-effective solution employing on-vehicle power electronics components to protect vehicle hardware from an unintended voltage source during vehicle towing. The process employs low power systems and a low-cost DC/DC converter to provide the power for detecting the UCG conditions. The controllers are in standby mode to further reduce the power losses when not in use if the low-voltage DC power bus 55 bus is damaged prior to towing. The power rating of the needed DC/DC as the second power source of 12V is significantly reduced from 260 Watts to less than 5 Watts by utilizing the APM to provide the main 12V power to the cooling systems.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electrified powertrain system for a vehicle, comprising:
   an electric machine mechanically rotatably coupled to a driveline;
   a plurality of low-voltage electrically-powered powertrain actuators;
   an inverter module including an inverter electrically connected between a high-voltage DC power bus and the electric machine, and an inverter controller;
   a low-power DC/DC converter electrically connected between the high-voltage DC power bus and the inverter controller; and
   an auxiliary power module electrically connected to the high-voltage DC power bus and electrically connected to a low-voltage DC power bus;
   wherein the inverter controller directly communicates with the auxiliary power module;
   wherein an ignition module indicates either a key-on state, a key-accessory state or a key-off state; and
   wherein, when the ignition module is in either the key-off state or the key-accessory state:
      the low-power DC/DC converter generates an output voltage having a magnitude sufficient to activate the inverter controller, wherein the output voltage originates on the high-voltage DC power bus,
      the inverter controller detects the electric machine operating in a key-off uncontrolled generator (UCG) mode,
      the inverter controller directly communicates detection of the key-off UCG mode to the auxiliary power module,
      the inverter controller controls the inverter, and
      the auxiliary power module supplies electric power to operate the low-voltage electrically-powered powertrain actuators.

2. The electrified powertrain system of claim 1, wherein the inverter controller detecting the electric machine operating in the key-off UCG mode comprises the inverter controller detecting a vehicle speed greater than a minimum threshold and a voltage level of the high-voltage DC power bus greater than a minimum threshold.

3. The electrified powertrain system of claim 1, wherein the low-voltage electrically-powered powertrain actuators comprise one of a motor cooling pump, an oil pump and an auxiliary power module cooling pump.

4. The electrified powertrain system of claim 1, further comprising discontinuing the inverter controller controlling the inverter and discontinuing the auxiliary power module supplying electric power to operate the low-voltage electrically-powered powertrain actuators when the key-off UCG mode is no longer detected.

5. The electrified powertrain system of claim 1, wherein the inverter controller controlling the inverter comprises the inverter controller controlling electric power flow to the high-voltage DC power bus.

6. The electrified powertrain system of claim 1, further comprising the electric machine mechanically rotatably coupled to the driveline through a gear train.

7. An electrified powertrain system for a vehicle, comprising:
   an electric machine mechanically rotatably coupled to a driveline;
   an inverter module including an inverter electrically connecting a high-voltage DC power bus to the electric machine, an inverter controller and a low-power DC/DC converter;
   the low-power DC/DC converter electrically connected between the high-voltage DC power bus and the inverter controller; and
   an auxiliary power module including a second DC/DC converter electrically connected to the high-voltage DC power bus and electrically connected to a low-voltage DC power bus and an APM controller;
   wherein the auxiliary power module directly communicates with a body controller;
   wherein the auxiliary power module supplies electric power to a plurality of low-voltage electrically-powered powertrain actuators through the second DC/DC converter;
   wherein an ignition module indicates one of a key-on state, a key-accessory state and a key-off state; and
   wherein, when the ignition module is in the key-off state or the key-accessory state:
      the low-power DC/DC converter generates an output voltage originating on the high-voltage DC bus, the output voltage having a magnitude sufficient to activate the inverter controller;
      the APM controller detects if the electric machine operating in an uncontrolled generator (UCG) mode;
      the APM controller directly communicates detection of the UCG mode to the body controller;
      the body controller activates the inverter controller;
      the inverter controller controls the inverter to control electric power flow to the high-voltage bus; and
      the auxiliary power module supplies electric power to operate the low-voltage electrically-powered powertrain actuators.

8. The electrified powertrain system of claim 7, wherein the APM controller detecting the electric machine operating in an uncontrolled generator (UCG) mode comprises the APM controller detecting a vehicle speed greater than a minimum threshold and a voltage level of the high-voltage DC power bus greater than a minimum threshold.

9. The electrified powertrain system of claim 7, wherein the low-voltage electrically-powered powertrain actuators comprise one of a motor cooling pump, an oil pump and an auxiliary power module cooling pump.

10. The electrified powertrain system of claim 7, further comprising discontinuing the inverter controller controlling the inverter and discontinuing the auxiliary power module supplying electric power to operate the low-voltage electrically-powered powertrain actuators when the key-off UCG mode is no longer detected.

11. The electrified powertrain system of claim 7, wherein the inverter controller controlling the inverter comprises the inverter controller controlling electric power flow to the high-voltage DC power bus.

12. The electrified powertrain system of claim 7, further comprising the electric machine mechanically rotatably coupled to the driveline through a gear train.

13. A method for controlling an electrified powertrain system for a vehicle including an electric machine mechanically rotatably coupling to a driveline, an inverter module including an inverter electrically connecting between a high-voltage DC power bus and the electric machine, an inverter controller and a low-power DC/DC converter, the low-power DC/DC converter electrically connecting between the high-voltage DC power bus and the inverter controller, an auxiliary power module electrically connecting to the high-voltage DC power bus and electrically connecting to a low-voltage DC power bus, the inverter controller directly communicating with a controller of the auxiliary power module, and an ignition module indicating one of a key-on state, a key-accessory state and a key-off state, the method comprising:

detecting either the key-off state or the key-accessory state;
generating an output voltage sufficient to activate the inverter controller via the low-power DC/DC converter;
detecting if the electric machine is operating in a key-off uncontrolled generator (UCG) mode;
communicating detection of the key-off UCG mode to the auxiliary power module;
controlling the inverter; and
supplying electric power from the auxiliary power module to operate low-voltage electrically-powered actuators.

14. The method of claim 13, wherein detecting if the electric machine is operating in a key-off UCG mode comprises detecting a vehicle speed greater than a minimum threshold and a voltage level of the high-voltage DC power bus greater than a minimum threshold.

15. The method of claim 13, wherein supplying electric power from the auxiliary power module to operate low-voltage electrically-powered actuators further comprises supplying electric power from the auxiliary power module to operate cooling systems for the electric machine and the inverter including a motor cooling pump, an oil pump and an auxiliary power module cooling pump.

16. The method of claim 13, further comprising discontinuing the inverter controller controlling the inverter and discontinuing the auxiliary power module supplying electric power to operate the low-voltage electrically-powered powertrain actuators when the key-off UCG mode is no longer detected.

17. The method of claim 13, wherein controlling the inverter comprises the controlling electric power flow to the high-voltage DC power bus.

* * * * *